United States Patent
Maddocks et al.

(10) Patent No.: US 6,724,409 B1
(45) Date of Patent: Apr. 20, 2004

(54) TREE-BASED GRAPHICAL USER INTERFACE FOR CREATING AND EDITING MACHINE CONTROL SEQUENCES

(75) Inventors: Peter M. Maddocks, Ft. Collins, CO (US); David P. Ferguson, Berthoud, CO (US); Douglas Wesley Rauenzahn, Sunnyvale, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 562 days.

(21) Appl. No.: 09/714,330

(22) Filed: Nov. 16, 2000

(51) Int. Cl.[7] .................................................. G06F 9/45
(52) U.S. Cl. ........................................ 345/853; 345/751
(58) Field of Search ................................ 345/853, 967, 345/751–759

(56) References Cited

U.S. PATENT DOCUMENTS

| | | | | |
|---|---|---|---|---|
| 5,546,519 A | * | 8/1996 | Berry | 345/763 |
| 5,953,726 A | * | 9/1999 | Carter et al. | 707/103 R |
| 6,208,640 B1 | * | 3/2001 | Spell et al. | 370/358 |
| 6,298,474 B1 | * | 10/2001 | Blowers et al. | 717/104 |
| 6,466,240 B1 | * | 10/2002 | Maslov | 345/853 |

* cited by examiner

Primary Examiner—Cao (Kevin) Nguyen
(74) Attorney, Agent, or Firm—Hewlett Packard Company

(57) ABSTRACT

A tree-based graphical user interface (GUI) creates and edits command sequences. The GUI simultaneously displays a tree structure and a list. The tree includes a sequence, which is the root node of the tree, at least one step branching from the sequence node, at least one device branching from each step node, and at least one command branching from each device node. When a step node of the tree is selected, the list displays devices that can be added to the step node. When a device node is selected, the list displays commands that can be added to the step. Items can be added or removed from the selected node. The steps, devices, and commands can be configured by selecting the corresponding node in the tree, and by selecting appropriate options on the screens. Operations can be performed absent knowledge of the underlying code and command sequences.

20 Claims, 6 Drawing Sheets

```
#! /usr/bin/ksh -x                  ─ 2
##############################################################
#                                                            #
# File:      Mttest_eot                                      #
# Description: This is a test script that tests device and driver #
#              functionality                                 #
# Arguments:  arg1 = path to directory used to create temporary test data #
#             arg2 = tape device file                        #
# Author:                                                    #
# Created:                                                   #
#                                                            #
# Modified:                                                  #
#                                                            #
# Language:  ksh script                                      #
#                                                            #
# (C) Copyright 1996, Hewlett-Packard, all rights reserved.  #
#                                                            #
##############################################################

# START the testing here.
echo "##############################################################"
echo "STARTING $0 at `date`"
echo "##############################################################"
# Export various environment variables.
export pid=$$           ◄─ 3
export CP_OK=0          ◄─ 4              ◄ 5
export PRODUCT_ID=`../tools/mtinfo -i -d ${DEVICE_FILE_NAME}b |grep -i PROD |
awk '{ print $3 }'`
# if an old Mttest_tmpdef file exists, remove it.
if [ -f /tmp/Mttest_tmpdef.$$ ]
then                              ─ 6
   /bin/rm /tmp/Mttest_tmpdef.$$
fi
# Run the Mttest_bst_c1 file which will create a temporary file containing
# some essential environment information.
../tests/Mttest_bst_c1 $DATAPATH ${DEVICE_FILE_NAME}b       ─ 7
/tmp/Mttest_tmpdef.$$ $EXIT_STATUS 2>/tmp/Mttest_tmpdef.$$
# Now invoke the newly created file.
```

*FIG. 1*

(PRIOR ART)

TREE-BASED GRAPHICAL USER INTERFACE FOR CREATING AND EDITING MACHINE CONTROL SEQUENCES

TECHNICAL FIELD OF THE INVENTION

The present invention relates to a method and apparatus for creating and editing machine control sequences via a tree-based graphical user interface (GUI) system, which eliminates the problems associated with using text-based scripts to create or edit machine control sequences.

BACKGROUND OF THE INVENTION

In backup storage systems, such as those used for large servers, robotics are often employed to move tapes to and from drives in order to store backup data from the servers on the tapes. These backup storage systems are tested by issuing various machine control sequences that cause the robotics and drives to perform various operations and measuring the results. Currently, text-based scripts are used to create the machine control sequences that are used to perform these operations. In order to modify the machine control sequences, the text-based scripts must be modified. Both creating and modifying text-based scripts can be extremely difficult and time-consuming tasks due to the cryptic nature of text-based scripts.

An example of a portion of a text-based script written in k shell is shown in FIG. 1. This particular script is used to test the functionality of a particular device and the device driver. These types of scripts are normally created using a word editor, and are written in a particular language that can be interpreted by an interpreter designed to interpret scripts written in that language. The box 2 is a comment box that is intended to provide certain information about the script, such as details regarding the test it performs and the language in which it was written (e.g., k shell, c shell and b shell), for example. The lines 3, 4 and 5 perform exports on certain environment variables that will be used by the script in performing the test. The portion 6 of the script removes a particular temporary test file if one already exists and the portion 7 then creates a temporary test file that contains certain environment information that needs to be utilized by the script to perform the test.

Although the comment box 2 and the comment lines (i.e., the lines beginning with "#") provide information about the script and the various functions it performs, ascertaining the overall purpose of the script and the functions associated with certain lines of the script are still difficult tasks. Often times, the person charged with the task of interpreting and understanding the script is not the same person who wrote the script. In this case, these tasks may be extremely challenging, requiring both that the person understand the language in which the script was written and have skill in writing scripts written in that language. Furthermore, scripts often call other scripts, which makes these tasks even more difficult, because the person may need to also look at and understand the script that is called. Nevertheless, it is common for persons other than the designer of a script to be challenged with the tasks of reading and understanding the script in order to use it, debug it, or modify it.

Accordingly, a need exists for way to create and/or modify machine control sequences that overcomes these shortcomings.

SUMMARY OF THE INVENTION

The present invention provides a tree-based graphical user interface (GUI) that enables command sequences to be easily created and edited by a user, thereby eliminating the need for the user to deal with text-based scripts and the associated difficulties. The GUI simultaneously displays a tree structure and a list. The tree structure is comprised of a sequence, which is the root node of the tree structure, at least one step branching off of the sequence node, at least one device branching off of each step node, and at least one command branching off of each device node. The list displays items that can be added to the tree structure. When a step node of the tree structure is selected, the list displays devices that can be added to the step node. When a device node is selected, the list displays commands that can be added to the step. Items can be easily added to or removed from a selected node of the tree structure. Therefore, the steps, devices and commands that comprise the machine control sequences can be easily created and edited without requiring that the user understand the underlying code.

In accordance with the preferred embodiment, if a sequence node is selected by the user by, for example, placing the cursor on that node and clicking the left mouse button, the list will display a list of steps. A step can be added to the tree structure by highlighting the desired step in the list and then by selecting an "ADD" button. In order to remove a step from the tree structure, the step is highlighted and then a "REMOVE" button is selected. This action will cause the selected step and any devices branching off of the step and their associated commands to be removed from the tree structure. If a step node is selected, the list will display a list of devices that can be added to the step in the tree structure. A device can be added by selecting the aforementioned "ADD" button. Devices can be deleted from a step by highlighting the device to be removed and by selecting the aforementioned "REMOVE" button. If a device node is selected in the tree structure, a valid set of commands that can be used with the device will be listed in the list. Commands can then be added to the tree structure by using the "ADD" button in the aforementioned manner. Commands can be removed from the tree structure by using the "REMOVE" button in the aforementioned manner.

The steps, devices and commands in the tree structure can also be easily configured via the GUI. In accordance with the preferred embodiment, a step, device or command can be configured by selecting the corresponding node in the tree structure and by right-clicking the mouse button, which will cause a corresponding screen to be displayed. The user then selects the appropriate options in the screen to configure the step, device or command.

Preferably, the GUI code, its associated user interaction handling code and the commands that make up the control sequences are written in the JAVA™ programming language so that the invention is platform independent and thus is portable over various types of computing devices, including, for example, UNIX workstations, personal computers (PCs), Macintosh computers, handheld computing devices, appliances, etc. Other programming languages can also be used for these purpose. Preferably, an object-oriented language is used for the GUI code, its associated user interaction handling code and the commands that make up the control sequences.

Other features and advantages of the present invention will become apparent from the following discussion, drawings and claims.

BRIEF DESCRIPTION OF THE DRAWINGS

FIG. 1 is a portion of a text-based script of the type used for machine control sequences.

DETAILED DESCRIPTION OF THE INVENTION

Figure 2:
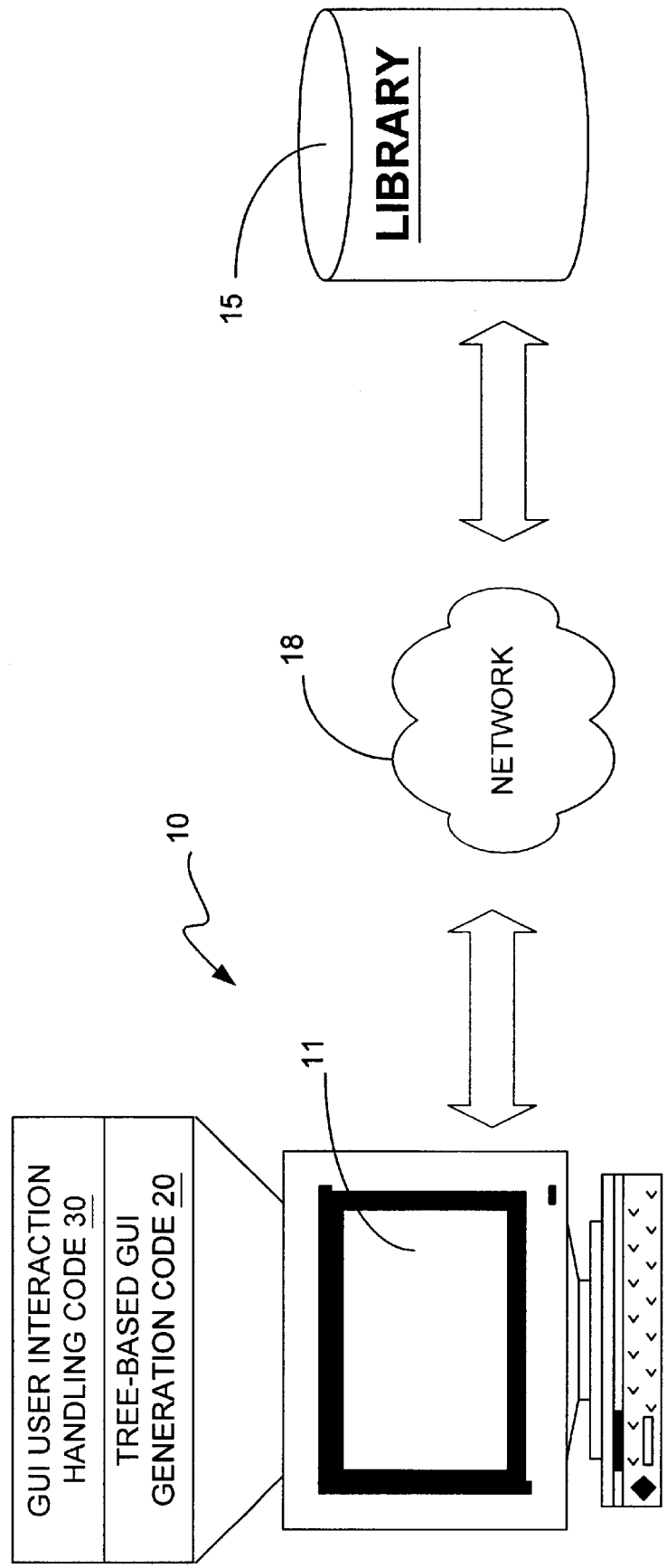
FIG. 2 is a diagram illustrating a computer capable of generating and displaying the tree-based GUI of the present invention and of executing the associated GUI user interaction handling code.

The present invention provides a tree-based graphical user interface (GUI) that enables test programs to be set up at a very high level. Furthermore, the GUI of the present invention enables parameters used in the programs to be easily changed at a very high level in order to easily modify the test programs. FIG. 2 is a block diagram illustrating a computer 10, which corresponds to the apparatus of the present invention and which performs the methods of the present invention, namely, generating the tree-based GUI and executing the associated GUI user interaction handling code. As shown in FIG. 2, the computer 10 executes GUI generation code 20 and the associated GUI user interaction handling code 30.

When the computer 10 begins executing the GUI generation code 20, a tree-based GUI sequence editor (FIGS. 2 and 3) is displayed on the display monitor 11 of the computer 10. When the computer 10 executes the GUI generation code 20, GUI user interaction handling code 30 is also executed. The GUI user interaction handling code 30 responds to selections made by a user in the GUI by performing operations, such as, for example, displaying a particular window of the GUI on the display monitor 11, configuring a device, or adding/altering a command of a particular sequence. All of the information needed to enable tests to be set up and executed using the GUI of the present invention may be stored in a memory device (not shown) comprised by computer 10.

Alternatively, some or all of the needed information could be stored in a memory device 15 that functions as a library or repository for command sequences and tests that have previously been created, and environment variables used in the tests. In the latter case, the computer 10 would communicate with the memory device 15 via a network 18, which could be, for example, a local area network, a wide area network, the Internet, etc. This type of configuration would enable multiple users to create new command sequences at their workstations by accessing previously created command sequences over the network 18 that have been stored in the repository. Additionally, the newly created command sequences could be stored in the repository memory device 15 so that the new sequences would be available for use by other users connected to the network 18.

Preferably, the tree-based GUI generation code and user interaction handling code 20 and 30, respectively, are written in the JAVA™ programming language to enable them to platform independent. This enables the tree-based GUI to be used on different computers, handheld devices and appliances regardless of the operating system that is running on them. Given the discussion and drawings provided herein, those skilled in the art will understand the manner in which the tree-based GUI of the present invention could be implemented in the JAVA™ programming language or some other language. The language used, whether it is the JAVA™ programming language or some other language, preferably is an object-oriented language, so that the benefits associated with object-oriented programming are incorporated into the present invention.

Figure 3:
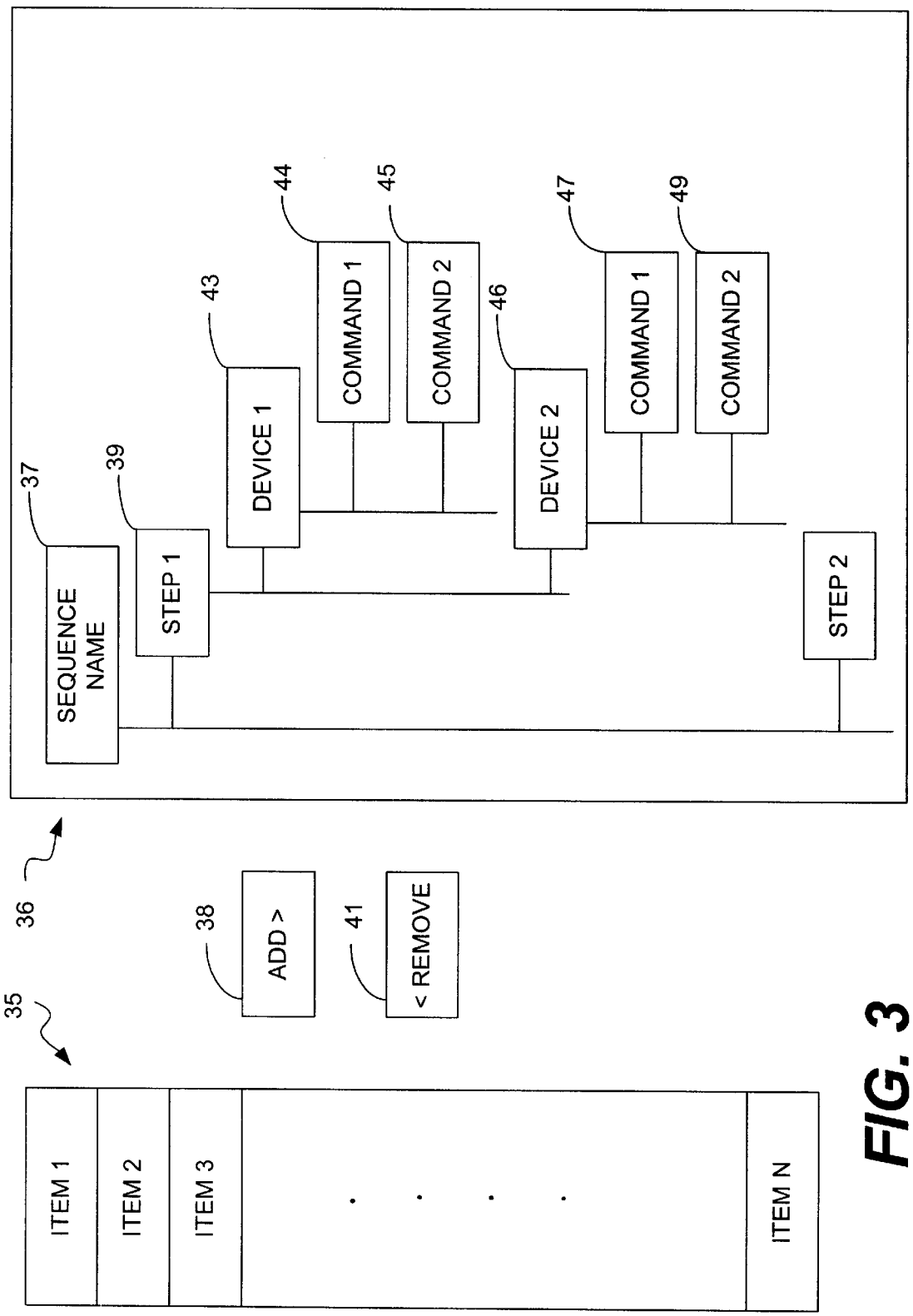
FIG. 3 is a diagram illustrating the tree-based GUI of the present invention and the manner in which it can be utilized to create or edit machine control sequences.

FIG. 3 is a diagram of the sequence editor of the GUI in accordance with the preferred embodiment, which is the initial screen displayed to the user. The block 35 is the "JAVA™ List Control" (hereinafter "Jlist"), which comprises a list of items 1 through N. The items may be "Steps", "Devices", or "Commands", depending on which node in the JAVA™ tree control 36 (hereinafter "Jtree") is selected, as will now be described. The Jtree 36 is a hierarchical tree structure of sequences, steps, devices and commands, with the sequence being at the root of the tree structure. Each of the blocks in the Jtree 36 can be viewed as nodes in the tree structure. The "Sequence Name" 37 corresponds to the sequence to be used or edited. Each sequence comprises at least one step, each of which has at least one device belonging to it. Each device has at least one command belonging to it.

If the "Sequence Name" 37 is selected by the user by, for example, placing the cursor on that node and clicking the left mouse button, the Jlist 35 will display a list of steps. A step can be added to the tree structure by highlighting the desired step in the Jlist 35 and then selecting the "ADD" button 38. In order to remove a step from the Jtree 36, the step, such as "Step 1" 39, is highlighted and then the "REMOVE" button 41 is selected. This action will cause the selected step and any devices branching off of the step and their associated commands to be removed from the Jtree 36. Therefore, if Step 1 is highlighted and the "REMOVE" button 41 is selected, Device 1 and Commands 1 and 2, which are labeled with numerals 43, 44 and 45.

If a step node is selected, the Jlist 35 will display a list of devices that can be added to the step in the Jtree 36. For example, if "Device 2", which is labeled with numeral 46, is selected, a list of devices that can be added to Step 1 will be displayed in the Jlist 35. A device can be added by using the "ADD" button 38 in the aforementioned manner. Devices can be deleted from a step by highlighting the device to be removed and by using the "REMOVE" button in the aforementioned manner. For example, removing Device 2 will cause that device and the commands 47 and 48, which belong to it, to be removed from the Jtree 36.

If a device node is selected by, for example, clicking the left mouse button once, a valid set of commands that can be used with the device will be listed in the Jlist 35. Commands can then be added to the Jtree 36 by using the "ADD" button 38 in the aforementioned manner. Commands can be removed from the Jtree 36 by using the "REMOVE" button in the aforementioned manner.

Figure 4:
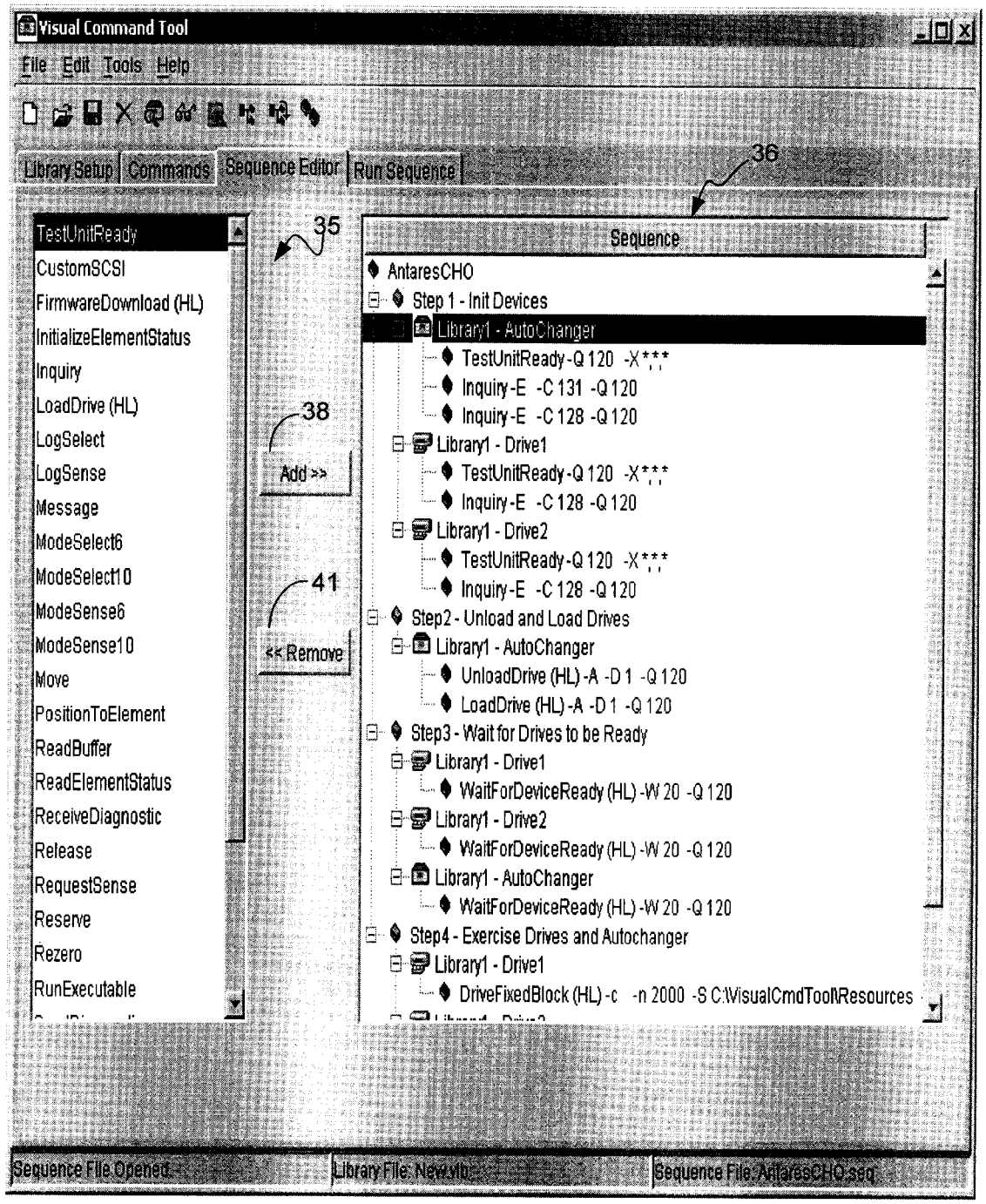
FIG. 4 is a screen shot illustrating an example of an implementation of the tree-based GUI of the present invention shown in FIG. 3.

FIG. 4 is a screen shot of an exemplary implementation of the tree-based GUI shown in FIG. 3. The device node labeled "Library 1—AutoChanger" has been selected in the Jtree 36, thereby causing a valid list of commands for this device to be displayed in the Jlist 35. Step 1 in FIG. 4 is an initialization step that initializes all of the devices belonging to the step, namely, an AutoChanger and tape drives 1 and 2. The other steps correspond to various operations performed by the AutoChanger in conjunction with the drives, such as loading and unloading particular tapes onto and from the drives. It can be seen that the sequence names, the device names and the commands are relatively easy to understand, which facilitates creating and editing command sequences.

Figure 5:
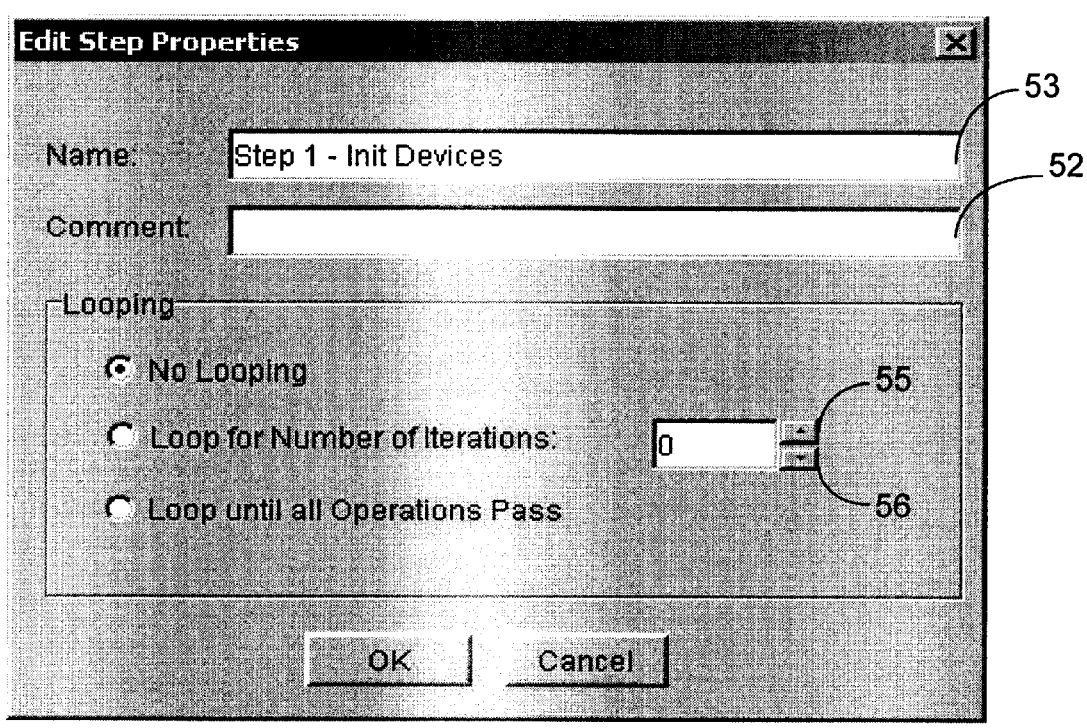
FIG. 5 is a screen shot that is presented to the user when a step node of the tree-based GUI shown in FIG. 4 is selected by the user.

Further explanations can be obtained by clicking with the left mouse button on one of the structures in the Jtree 36 to cause it to be highlighted and then clicking the right mouse button. These actions will cause a window to be displayed to the user that further describes the selected tree structure. For example, if applied to a step node, these actions would cause the screen 51 shown in FIG. 5 to be displayed to the user. The screen displays a name comment box 52 that can be used to type comments in that describe the step in detail. A name box 53 contains the name of the step. This window can also be used to further edit what a step does, i.e., to change the step without changing the device(s) or their command(s). For example, the user can select "Loop for Number of Iterations" to cause the step to loop for a number of iterations. The number of iterations is selected by clicking on the up or down buttons 55 and 56.

Alternatively, the option "Loop until all Iterations Pass" could be selected to cause the step to be iterated until all operations associated with it pass, i.e., have been successfully performed. Another option is to select "No Looping" so that the step is only performed once. Thus, levels of logic can be easily added without the user having to deal with lots of statements and parameters. Once the step properties have been set, the user clicks the "OK" button, which will cause the screen shown in FIG. 4 to once again be displayed.

Figure 6:
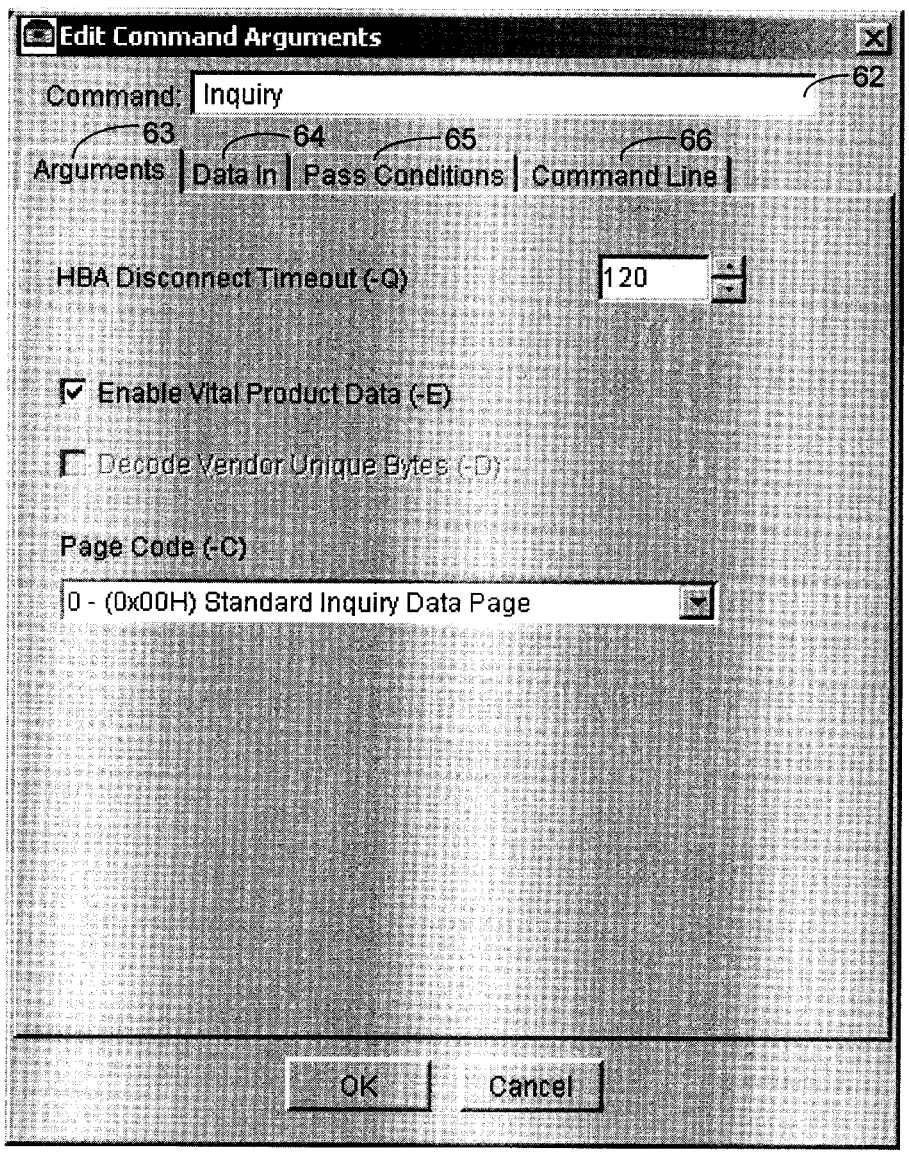
FIG. 6 is a screen shot that is presented to the user when a command node of the tree-based GUI shown in FIG. 4 is selected by the user.

FIG. 6 illustrates a screen 61 that is displayed when the user highlights one of the commands in the Jtree 36 and then right-clicks. The name of the command is shown in the box 62. This screen will vary depending on the command because different commands require different parameters. For example, some commands, such as a write command, take data out, whereas some commands, such as the Inquiry command shown, take data in. Therefore, the window depicted has a "Data In" tab 64, which, if selected, will cause options to be displayed to the user indicating the types of data that can be selected for utilization in executing the command. The "Pass Conditions" tab 65, if selected, will cause options to be displayed that indicate the types of conditions that must be met for successful command execution. The "Command Line" tab 66, if selected, provides the user with directly editing the command line. The screen shown 63 is the arguments screen, which enables the user to configure the arguments associated with the command.

It can be seen from all of the above that the present invention enables machine control sequences to be easily created and modified at a high level without requiring that the user necessarily understand the underlying language of the code associated with the tree-based GUI or the object code that the selections made by the user correspond. Thus, the difficulties associated with text-based scripts are eliminated, which facilitates writing and understanding machine control sequences, even by persons other than the person who originally created them.

The present invention has been described with reference to the preferred embodiments. However, it is not limited to these embodiments. For example, the screen shots provided herein demonstrate the manner in which the tree-based GUI of the present invention can be implemented, but do not represent the only way for implementing the tree-based GUI. Those skilled in the art will understand that the screens and the options displayed can be modified for a particular application domain. For example, the application domain discussed herein is backup storage system testing and the screen shots have been designed to apply to this domain. Other application domains will require other types of screens and/or options, as will be understood by those skilled in the art. The tree-based GUI of the present invention equally applies to various other application domains and the manner in which the GUI discussed herein can be applied, directly or through some modification, will be understood by those skilled in the art. It will be understood that the scope of the present invention includes all such applications and modifications.

What is claimed is:

1. An apparatus for generating a tree-based graphical user interface (GUI), the apparatus for generating the tree-based GUI capable of being used to create or edit machine control sequences, the apparatus comprising:

a computer, the computer being programmed to execute GUI generation code and GUI user interaction handling code;

a display device in communication with the computer, wherein when the computer executes the GUI generation code, an item list and a tree structure are simultaneously displayed on the display device, the tree structure comprising a machine control sequence comprised of at least one step, wherein each step includes at least one device to be utilized in the step, the at least one device hierarchically differentiated within the tree structure from the at least one step, and at least one command to be executed in the step, the at least one command hierarchically differentiated within the tree structure from the at least one step and the at least one device, the item list displaying commands that can be added to the tree structure.

2. The apparatus of claim 1, wherein when the GUI user interaction handling code is executed by the computer, interactions between a user and the tree-based GUI are processed by the computer, wherein when the at least one step in the tree structure is selected by a user, the item list displays a list of at least one device that can be added to the tree structure as an additional device to be utilized in the at least one step, and when a device in the tree structure is selected by a user, the item list displays a list of at least one command that can be added to the tree structure as an additional command to be executed in the at least one step.

3. The apparatus of claim 2, wherein said at least one device is added to the tree structure when a user selects said at least one device from the item list, and wherein said at least one command is added to the tree structure when a user selects said at least one command from the item list.

4. The apparatus of claim 3, wherein the GUI generation code and the GUI user interaction handling code are written in an object-oriented programming language.

5. The apparatus of claim 4, wherein the object-oriented programming language is a JAVA™ programming language.

6. The apparatus of claim 1, wherein the tree-based GUI causes information to be displayed on the display device in a windows environment, and wherein certain interactions between a user and the tree-based GUI causes certain windows to be displayed on the display device.

7. The apparatus of claim 6, wherein one of said certain interactions causes an Edit Step Properties window to be displayed on the display device, the Edit Step Properties window providing options to a user to enable the user to configure properties to be associated with the step of the sequence.

8. The apparatus of claim 7, wherein one of said properties corresponds to a number of iterations of the step that is to be performed, one of said options provided in the Edit Step Properties window enabling the user to select the number of iterations of the step that is to be performed.

9. The apparatus of claim 6, wherein one of said certain interactions causes an Edit Command Arguments window to be displayed on the display device, the Edit Command Properties window providing options to a user to enable the user to configure properties to be associated with at least one command within the sequence.

10. The apparatus of claim 3, wherein the user interaction handling code is designed to handle point-and-click actions taken by a user who uses a pointing device to control an on-screen cursor and to make selections displayed in the tree-based GUI, wherein the user causes said at least one device to be added to the tree structure by using the pointing device to select the step or device in the tree structure to thereby cause the item list to display said at least one device or said at least one command, respectively.

11. The apparatus of claim 10, wherein the user adds said at least one device to the tree structure by using the pointing device to select said at least one device from the item list and to select a displayed add option, and wherein the user adds said at least one command to the tree structure by using the pointing device to select said at least one command from the item list and to select the add option.

12. The apparatus of claim 1, wherein the GUI user interaction handling code is designed to handle point-and-click actions taken by a user who uses a pointing device to control an on-screen cursor and to make selections in the displayed tree-based GUI, the GUI user interaction handling code providing the user with the ability to remove a step, device or command from the tree structure, wherein the user causes a step, device, or command to be removed from the tree structure by using the pointing device to select a step, device or command in the tree structure that the user wishes to remove and by selecting a displayed remove option.

13. A method for creating and editing machine control sequences, the method comprising the steps of:

generating a tree-based graphical user interface (GUI) in a computer, the tree-based GUI being capable of being used by a user to create or edit machine control sequences; and displaying the tree-based GUI on a display device in communication with the computer, the tree-based GUI including an item list and a tree structure that are simultaneously displayed on the display device, the tree structure comprising a machine control sequence, comprising at least one step, wherein each step includes at least one device to be utilized in the step, the at least one device hierarchically differentiated within the tree structure from the at least one step, and at least one command to be executed in the step, the at least one command hierarchically differentiated within the tree structure from the at least one step and the at least one device, the item list illustrating commands that can be added to the tree structure.

14. The method of claim 13, further comprising the step of executing GUI user interaction handling code in the computer that enables interactions between a user and the tree-based GUI to be detected and processed by the computer, wherein if a step in the tree structure is selected by a user, the item list displays a list of at least one device that can be added to the tree structure as an additional device to be utilized in the step, and when a device in the tree structure is selected by a user, the item list displays a list of at least one command that can be added to the tree structure as an additional command to be executed in the step.

15. The method of claim 14, wherein said at least one device is added to the tree structure when a user selects said at least one device from the item list and selects a displayed add option, and wherein said at least one command is added to the tree structure when a user selects said at least one command from the item list and selects the displayed add option.

16. The method of claim 15, wherein the GUI generation code and the GUI user interaction handling code are written in an object-oriented programming language.

17. The method of claim 16, wherein the object-oriented programming language is a JAVA™ programming language.

18. A computer program for generating a tree-based graphical user interface (GUI) and for handling interactions between a user and the tree-based GUI when the tree-based GUI is displayed on a display device, the computer program enabling a user to interact with the tree-based GUI to create or edit machine control sequences, the computer program being embodied on a computer-readable medium, the computer program comprising:

a first code portion for generating the tree-based GUI and for causing the tree-based GUI to be displayed on the display device, the tree-based GUI including an item list and a tree structure that are simultaneously displayed on the display device, the tree structure comprising a machine control sequence, comprising at least one step, wherein each step includes at least one device to be utilized in the step, the at least one device hierarchically differentiated within the tree structure from the at least one step, and at least one command to be executed in the step, the at least one command hierarchically differentiated within the tree structure from the at least one step and the at least one device, the item list illustrating commands that can be added to the tree structure; and a second code portion for handling interactions between a user and the tree-based GUI.

19. The computer program of claim 18, wherein when a step in the tree structure is selected by a user interacting with the tree-based GUI, the item list displays a list of at least one device that can be added to the tree structure as an additional device to be utilized in the step, and wherein when a device in the tree structure is selected by a user interacting with the tree-based GUI, the item list displays a list of at least one command that can be added to the tree structure as an additional command to be executed in the step.

20. The computer program of claim 18, wherein when a user selects a step in the tree structure to be removed from the sequence, selection of a displayed remove option by the user will cause the step to be removed from the sequence, and wherein when a user selects a device in the tree structure to be removed from the sequence, selection of the displayed remove option by the user will cause the device to be removed from the sequence, and wherein when a user selects a command in the tree structure to be removed from the sequence, selection of the displayed remove option by the user will cause the command to be removed from the sequence.

* * * * *